July 11, 1961

M. A. EKREN ET AL 2,991,755

TRAILER CHUTE

Filed March 24, 1958

INVENTORS
MILTON A. EKREN
HAAKON M. EKREN JR.
BY Ralph L. Dugger
ATTORNEY

July 11, 1961

M. A. EKREN ET AL 2,991,755

TRAILER CHUTE

Filed March 24, 1958

INVENTORS
MILTON A. EKREN
HAAKON M. EKREN Jr.
BY Ralph L. Dugger
ATTORNEY

United States Patent Office 2,991,755
Patented July 11, 1961

2,991,755
TRAILER CHUTE
Milton A. Ekren and Haakon M. Ekren, Jr., Kensal, N. Dak., assignors to Dolmar Manufacturing Company, Kensal, N. Dak., a corporation of North Dakota
Filed Mar. 24, 1958, Ser. No. 723,521
11 Claims. (Cl. 119—98)

This invention relates to an improved animal handling and conveying device, useful in the art of animal husbandry, and more particularly to an improved animal chute and trailer device.

There are many situations in the management of cattle of both the registered and grade varieties, where it is desirable to confine the animal temporarily or to transport an animal. Thus for dehorning, hoof trimming, castration, vaccination, applying nose rings, veterinarian examinations, and treatment, milking out cows which have lost calves, cleaning and trimming show animals, and such like procedures, to name but a few, all require the animal first to be brought into a holding pen and then into a cell in which it is closely confined. To do this without injury to the animal requires much skill and dexterity on the part of the husbandman. Many registered animals of fine lineage are exceedingly valuable and gentleness in handling is a prime requisite, and wildness is not usually so predominant in respect to such valuable and frequently handled stock. In respect to range cattle wildness is a problem and remoteness of location is a factor since much work is, of necessity, done on the range, and away from principal seats of operation. In respect to both grade and registered animals there are frequent instances when transportation of an animal is required.

While many prior devices have heretofore been suggested or devised for handling animals, none of these prior devices have provided the versatility, adaptability and ruggedness essential for the practical day-to-day handling of bovine stock of widely varying sizes, weights, and degrees of wildness, and which may be used for the widely varying husbandry operations necessary in the gentle management of both the registered and grade types of animals. It is accordingly an object of the invention to provide an improved device for use in animal husbandry and particularly for the handling and transportation of bovine animals.

It is another object of the invention to provide an improved trailer-chute for animal husbandry.

It is yet another object of the invention to provide a trailer-chute capable of being moved readily over high speed roads or over rugged terrain and of being set up for operation in a minimum time.

It is also an object of the invention to provide an improved trailer-chute wherein there is provided wind protection for an animal being carried in the device and in which the animal is securely confined, yet without harm to the animal.

It is a further object of the invention to provide an improved combination trailer-chute wherein the sides and ends are adapted to be repositioned for use of the device as a trailer or as a chute.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated in the drawings wherein corresponding numerals refer to the same parts, and wherein.

For sturdiness, freedom from deterioration, ease of manufacture, and economy we prefer to fabricate the device of our invention from structural steel shapes of standard dimensions, welded together for assembly, and the illustrative device of the invention now to be described is so made. For a few of the parts, as for example the floor and end gate (which is at times a ramp), we prefer wood, as this is beter for the animals. It will, however, be understood that other materials and modes of fabrication may be used, if desired, without departing from the teaching of the invention.

Referring to the drawings, the frame of our device includes a pair of sturdy angle-iron longitudinal rails 10 and 11 which are arranged so as to have flanges 10A and 11A inwardly directed and the other flanges 10B and 11B upwardly extending on the outside. These angles are the base side rails and they are connected together between their ends by equally sturdy cross-frame angles 14 and 15 and by a drop center axle 16, which will be described. These are all firmly welded together.

Figures 4, 14:
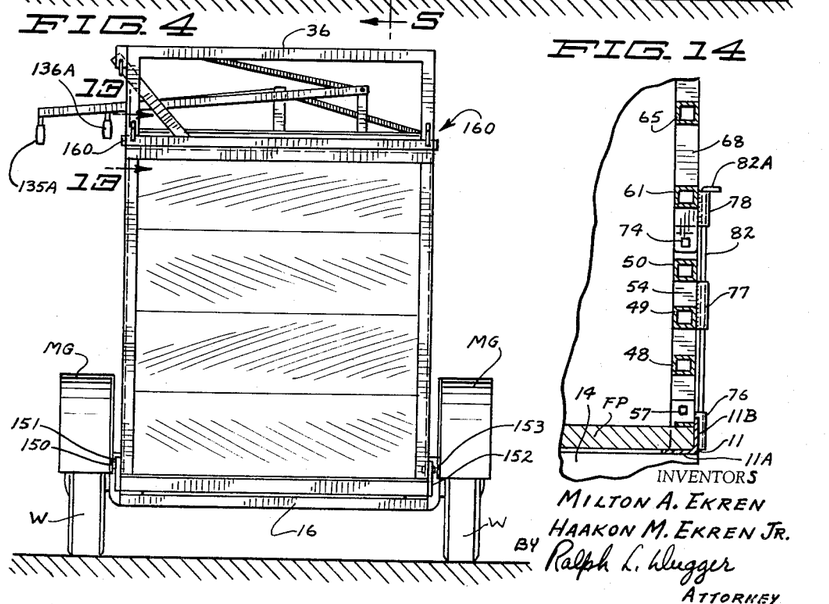
FIGURE 4 is an end elevational view, taken in the direction of arrows 4—4 of FIGURE 1.
FIGURE 14 is a fragmentary vertical sectional view taken along the line and in the direction of arrows 14—14 of FIGURE 1.
Figure 8:
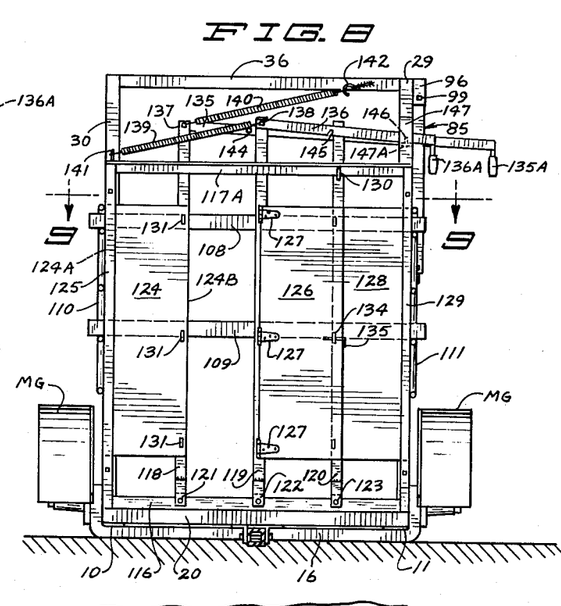
FIGURE 8 is also a front elevational view, corresponding to FIGURE 7, but the transport wheels are removed, so as to rest the trailer on the ground, and the front midpanel is opened and the pull rods by which the neck bars are manipulated are arranged in operating condition.
Figure 9:
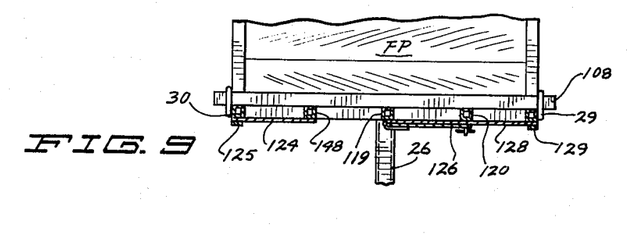
FIGURE 9 is a fragmentary horizontal sectional view taken along the line and in the direction of arrows 9—9 of FIGURE 8.

At each end, the rails are connected by tubular steel cross-frame members or angles, 20—20, as available, and the whole thus forms a secure rectangular frame. The axle 16 extends outwardly and then upward at each end, outside the frame members 10 and 11, as shown in FIGURES 4 and 8, the upward extension being sufficient so that wheel hubs 18 and 19 on the ends of the axle will be clear of the ground G when the demountable wheels W are removed and the center portion of the axle rests on the ground as shown in FIGURES 5, 6, 8 and 10. Over each wheel there is a sturdy mudguard MG. On the front cross-frame 20 there are a pair of downwardly extending angle clips 21 spaced to receive the tubular steel tongue 26 which is held in place by a through bolt 22 which passes through apertures in the clips. The rear end of tongue 26 is held by two downwardly extending angle iron bars 24—24 welded to the front cross-frame member 14. The members 24 have apertures 24A at several levels and the rear end of tongue 26 is appropriately apertured so that bolt 25 can be passed through. By selecting one or another of the apertures 24A the tongue can be made to stick out level or slant up more or less so that the attitude of the trailer can be kept level regardless of the height of the ball hitch on the towing vehicle (ball hitch and towing vehicle not shown). On the front end of the tongue there is provided a conventional ball hitch of extra heavy design.

The floor of the trailer is made of sturdy treated planks FP, which stretch from one side rail 10 to the other side rail 11, and rest on the horizontal in-turned flanges 10A and 11A, between the vertical flanges 10B and 11B. The vertical flanges are a little higher than the thickness of the planks and this permits a flat bar 10C and 11C to be laid on the ends of the planks adjacent the flanges 10B and 11B respectively and tack welded to the flanges. This secures the planks without the necessity of bolts. At each corner of the resultant floor FP and at two places along each side, the planks are notched to receive upright or correspondingly situated floor fittings as will be described. At each end of the floor, the planks FP are held down by flat bars 20C—20C laid on the upper surface of the planks and secured by welding to the adjacent cross-frame members 20—20.

Figure 2:
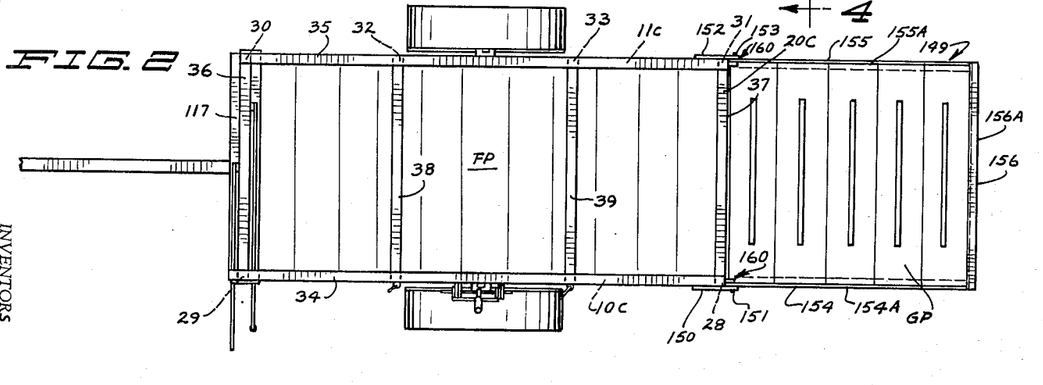
FIGURE 2 is a plan view, showing the end gate lowered to loading position.
Figure 3:
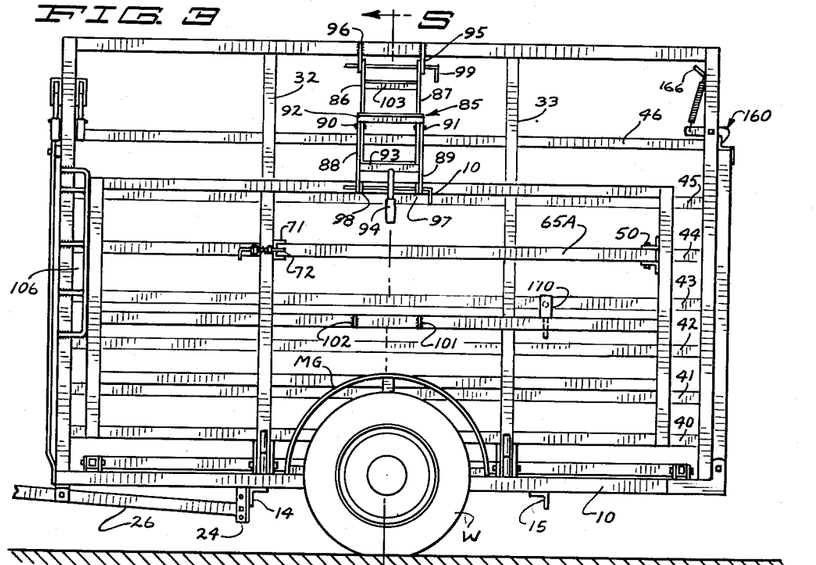
FIGURE 3 is a somewhat enlarged side elevational view showing the end gate closed but showing the near side of the device arranged as in one stock handling condition.
Figures 5, 15:
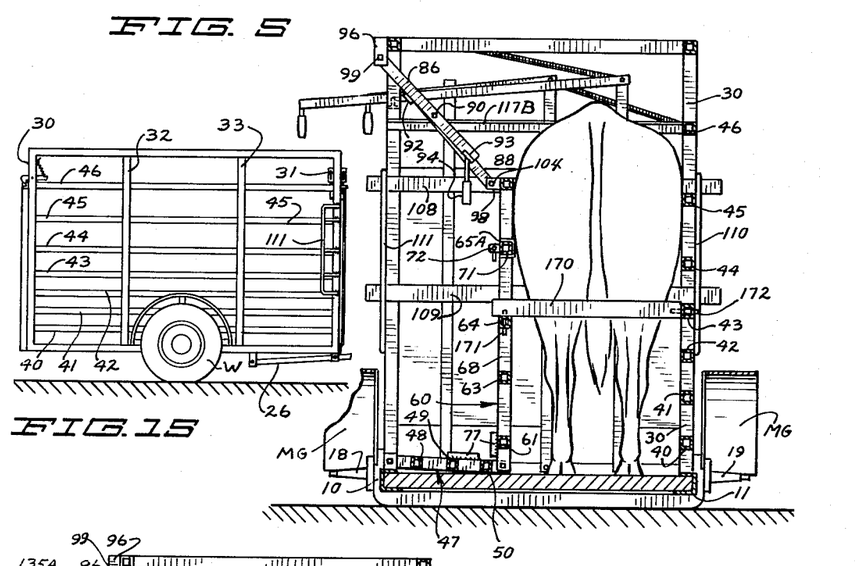
FIGURE 5 is a transverse, vertical sectional view taken along the line and in the direction of arrows 5—5 of FIGURE 3. In this view the animal is confined by the trailer sidewall and other features of the device.
FIGURE 15 is a perspective view looking somewhat forwardly showing the right side of the device.

At each of the corners there are located vertical posts 28, 29, 30 and 31 of rectangular steel tubing which are welded in place to the floor assembly of side rails 10—11 and cross-frame members 20—20. As noted, the floor planks FP are notched so that the corner posts can go all the way to the bottom flanges 10A and 11A. Between posts 30 and 31, on the right side of the trailer (looking forward), see FIGURES 2, 3, and 15, are two intermediate upright posts 32 and 33, which are likewise welded at the bottom to rail 11. At the top of the posts 28—33 there is welded on a rectangular frame composed of side top rails 34 and 35, front top cross-frame member 36 and rear top cross-frame member 37. Then, in between, at the positions of the tops of posts 34 and 35 are two intermediate top cross-frame members 38 and 39. All of these top peripherial and cross-frame members are preferably of tubular steel of rectangular cross-section. On the right side of the trailer there are a plurality of horizontal intermediate rails, at levels 40—46, of gradually increased spacing from bottom to top. These intermediate rails are also preferably made of the same rectangular tubular stock as posts 30—33 and the whole side is co-planar when complete, and is extremely sturdy.

Figure 6:
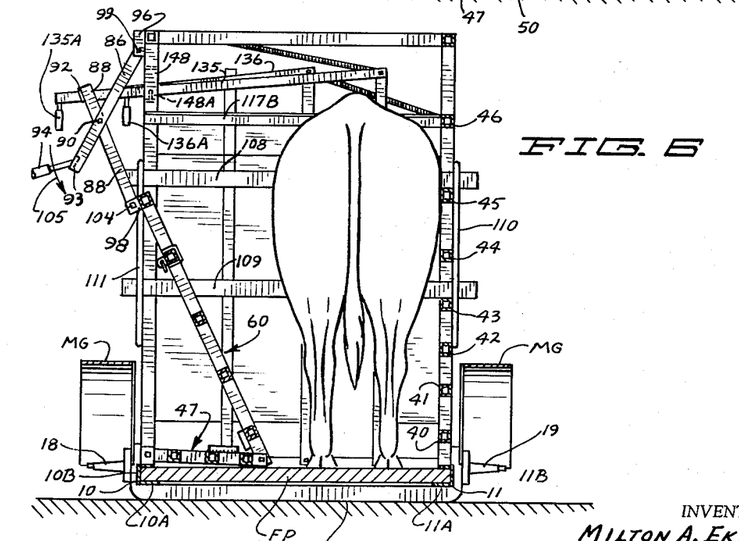
FIGURE 6 is a transverse, vertical sectional view corresponding to the position of FIGURE 5, but here the trailer sidewall is retracted to "open" position so as to allow the animal to be entered or released.

The whole left side of the trailer is composed of a side, which is attached to rail 10 by hinge pivots paralleling said rail, and hinged horizontally in the middle between the levels of rails 42 (of the right side). The whole left side may be raised vertically to form a trailer side enclosure (as in FIGURE 1) or lowered to stock chute position (as in FIGURES 3, 5 and 6). The construction details are as follows: At the bottom there is a panel generally designated 47 composed of bars 48, 49 and 50, spaced vertically so that when the left side is raised to the FIGURE 1 (trailer) position bars 48—50 will correspond in elevation with bars 40—42 respectively. These bars are fastened together by front post 51, rear post 52 and intermediate posts 54 and 55. Each post (51, 52, 54 and 55) extends the same length below bottom rail 48 and are hinged respectively to hinge mountings 56—59, the mountings being welded to rail 10. Hence this lower panel 47 can be swung from a vertical position (FIGURE 1) to a horizontal position (FIGURES 5 and 6).

Above panel 47 is a somewhat higher vertical panel section generally designated 60. It is composed of bottom horizontal bar 61, and top horizontal bar 62, three intermediate horizontal bars 63, 64 and 65, front vertical post 66, rear vertical post 67, intermediate vertical post 68, which reaches from bar 61 to bar 62, and another intermediate vertical post 69 which reaches only from bar 61 to bar 64. The bar 65 has a portion 65A hingedly connected at hinge mounting 70 on rear post 67 and having its front end adapted to swing out (to give access), or to swing into the plane of panel 60 and be received in socket 71 where it is retained by spring biased latch rod 72. Post 69 hence extends only from rail 61 to rail 64.

The lower ends of posts 68 and 69 extend below rail 61 and are hinged upon hinge mountings 74 and 75 on the upper ends of respectively, the posts 54 and 55. These hinges (74—75) provide a hinge axis which parallels the rails 48—50 and 61—65 and are so located that when panels 47 and 61 are both swung upwardly to a vertical position, both panels will be co-planar and in the plane of posts 28 and 29, and bottom rails 10 and top rail 34. In such raised (vertical) position, panels 47 and 60 form a side of the trailer, and the two panels are held co-planar by a system of bar locks at hinges 74 and 75 as follows:

On posts 54 and 68 and on posts 55 and 69 there are welded pieces of pipe which are axially aligned. Thus on post 55 there is welded a piece of pipe 80 and in alignment with them on post 69 there is welded the piece of pipe 81. In alignment and on rail 10 there is welded a piece of pipe 79. Through these three pieces of pipe there is placed a rod 83, having a bent-over top 83A by which it can be manipulated and it stiffens the hinge 58 (between rail 10 and panel 47), and stiffens the hinge 75 (between panel 47 and panel 60). Similarly piece of pipe 76 is welded on rail 10 below post 54 of panel 47 and other pieces 77 and 78 are welded respectively on posts 54 and 68. Rod 82, having bent-over hand piece 82A is put down through the pipes 76, 77 and 78 and thus stiffens hinges 57 and 74. Thus, when panels 47 and 60 are raised and rods 82 and 83 are inserted as described, the panels are held co-planar and in vertical alignment with posts 28 and 29. And when rods 82 and 83 are removed, the two panels 47 and 60 can be hinged swung from the vertical position to the position of FIGURES 5 and 6.

Figure 1:
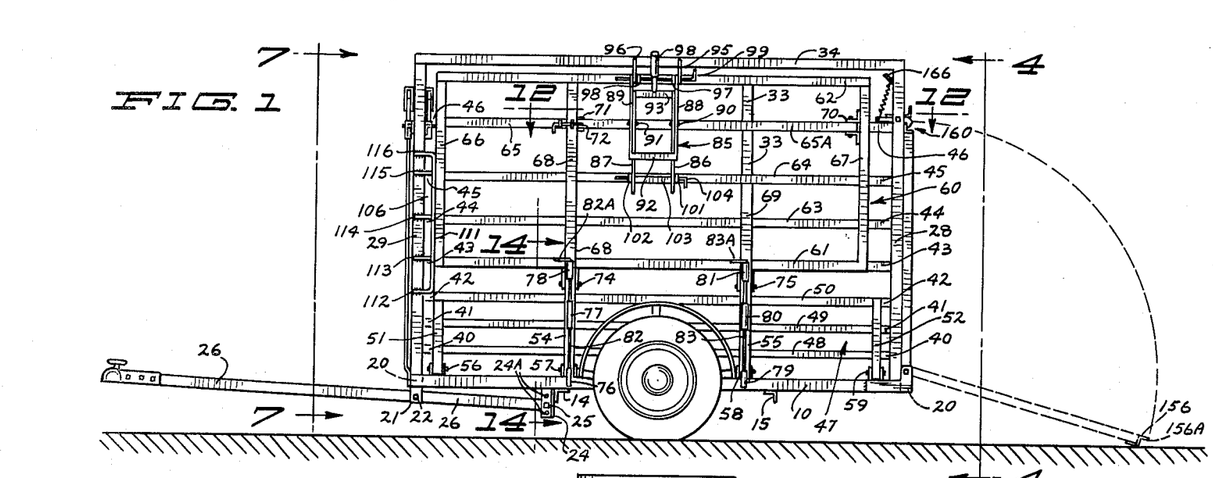
FIGURE 1 is a side elevational view, showing the apparatus of the invention in transport arrangement for carrying of an animal, and in which the end gate is shown in closed condition in full lines and in loading condition in dotted lines.

For manipulating the upper part of panel 60, during the stock chute operation and also for securing it vertically, when raised there is provided an over-center toggle frame generally designated 85 constructed as follows:

Toggle 85 is composed of two identical links 86 and 87 each pivoted (as at 90 and 91 respectively) to two cooperating links 88 and 89 respectively. See FIGURES 1 and 3. Note that in these figures the toggle 85 is reversed top-to-bottom. In FIGURE 1, handle 94 is down (secured position), whereas in FIGURE 3 the handle 4 is up (working position, see also FIGURES 5 and 6). Links 88 and 89 extend beyond the pivots 90—91 and are connected by cross bar 92, which forms an over-center stop in the FIGURE 5 position. Links 88 and 89 are "outside," whereas links 86 and 87 are "inside." Links 86 and 87 are fastened together at one end by cross bar 93 (to which handle 93 is welded), and are fastened together at the other end by cross bar 103. On top (left) side rail 34 there are welded two downwardly extending bars 95 and 96 which reach down far enough so that their inner edges form stops against which the top rail 62 of panel 60 may push when panels 47 and 60 are elevated as in the FIGURE 1 position. On top rail 62 there are two clips 97 and 98. Bars 95 and 96 are provided with holes, which line up with holes in clips 97 and 98 and are also aligned with holes in the ends (upper ends in FIGURE 1) in links 88 and 89 of toggle 85. When in the FIGURE 1 position, a pin 99, having a handle bent at one end, is inserted through these aligned holes or bars 95 and 96 and the holes in clips 97 and 98 and the rail 62 of panel 60 is effectively locked in upright position, which, with the stiffening effect of bars 82 and 83, previously described, holds the combined panels 47 and 60 as an effective "side" for the trailer. In this position the rails 48—50 (panel 47), left side of trailer are at positions corresponding to the levels of rails 40, 41, and 42, respectively, on the right side of the trailer. Similarly rails 61, 63, 64, 65—65A (of panel 60, left side of trailer) are at positions corresponding to the levels of rails 43—46, respectively, on the right side of the trailer.

It may be noted that with panels 47—60 thus locked-up in the trailer position, pin 99 suspends the toggle frame via the apertures in the (then upper) ends of links 88 and 89 through which pin 99 also passes. At the then bottom end of the toggle 85, which then hangs straight down and flat against the outside of panel 60, a pair of holes is provided in each of links 86 and 87, so as to receive pin 104 (see FIGURE 1). The pin 104 is positioned as shown in FIGURE 1, where it passes through aligned holes in two appropriately positioned clips 101 and 102 which are welded on rail 64. The lower end of the toggle frame 85 is thus secured and in so doing additionally secures panel 60.

When the apparatus is to be used as a chute for confining an animal, the bars 82 and 83 and pins 99 and 104 are removed. The toggle frame is thus free and is set aside temporarily and the panel 47 is swung down to the position of FIGURES 5 and 6. The panel 60 is swung out to the "open chute" position of FIGURE 6 and the toggle frame is re-attached but this time with the handle 94 down. This is shown in FIGURES 3, 5, and 6. In this position links 86—87 are up and are attached to bars 95—96 by inserting pin 99 through the end holes of each link. Also, links 88 and 89 are then down and these are coupled to clips 97 and 98 on rail 62 of panel 60, by inserting pin 104. The handle 94 then need only be pushed downwardly in the direction of arrow 105, FIGURE 6, to swing panel 60 form the "open" position of FIGURE 6 to the "closed," or animal confining position of FIGURE 5.

It will be noted that front ends of panels 47 and 60 are separated by a space 106 from the rear edge of post 29. This is to provide a space through which bars 108 and 109 can be inserted above or below the animal's neck to keep the animal from moving its head up or down (see FIGURES 5 and 6). The rails 40—46 on the right side of the device (see FIGURE 15) provide adequate intervals vertically for positioning the bars 108 and 109, and to keep the bars from sliding backwardly on the right side of the trailer there is provided a vertical rod 110 which has forwardly extending upper and lower ends which are welded to post 30. The rod 110 is additionally attached by welding it to rails 42—45, which it crosses.

On the left side of the trailer, see FIGURE 1, there is a similar vertical rod 111 having bottom end 112 and top end 116 bent forwardly and welded to post 29. In addition, and at the approximate levels of the tops of rails 43, 44, and 45, respectively (of the right side), there are provided short horizontal connecting rods 113, 114, and 115, these being welded to post 29 and vertical rod 111. These horizontals, 113—115 and bottom 112, thus provide on the left side of the trailer a solid perch for supporting the bars 108 and 109 (see FIGURES 5 and 6).

The front end construction of our trailer-chute is best illustrated in FIGURES 1, 3, and 5–10. Immediately above lower cross-frame member 20 there is welded in a rectangular tube 116 which serves as a base upon which each of three front posts 118, 119, and 120 are pivotally attached. Each post is of rectangular tube of the same dimension from front-to-back as the tube 116 and each post has a bar of steel welded on its front and rear lower surfaces. These bars form bifurcated ends which reach down over the tube 116 and pivots 121 (for post 118); 122 (for post 119) and 123 (for post 120) extend through these bifurcated lower ends and through tube 116, thus providing for sideways swinging movement of each post, from the position of FIGURES 7 and 8 to the position of FIGURE 10. The upper ends of the posts 118, 119, and 120 are confined against backward and forward movement by a pair of horizontal angle bars 117A and 117B welded to the front (see FIGURES 7 and 8) and rear surfaces (see FIGURES 5, 6, and 10), respectively of posts 29 and 30, at a level spaced downwardly below front top crossframe member 36.

Figures 10, 11, 12, 13:
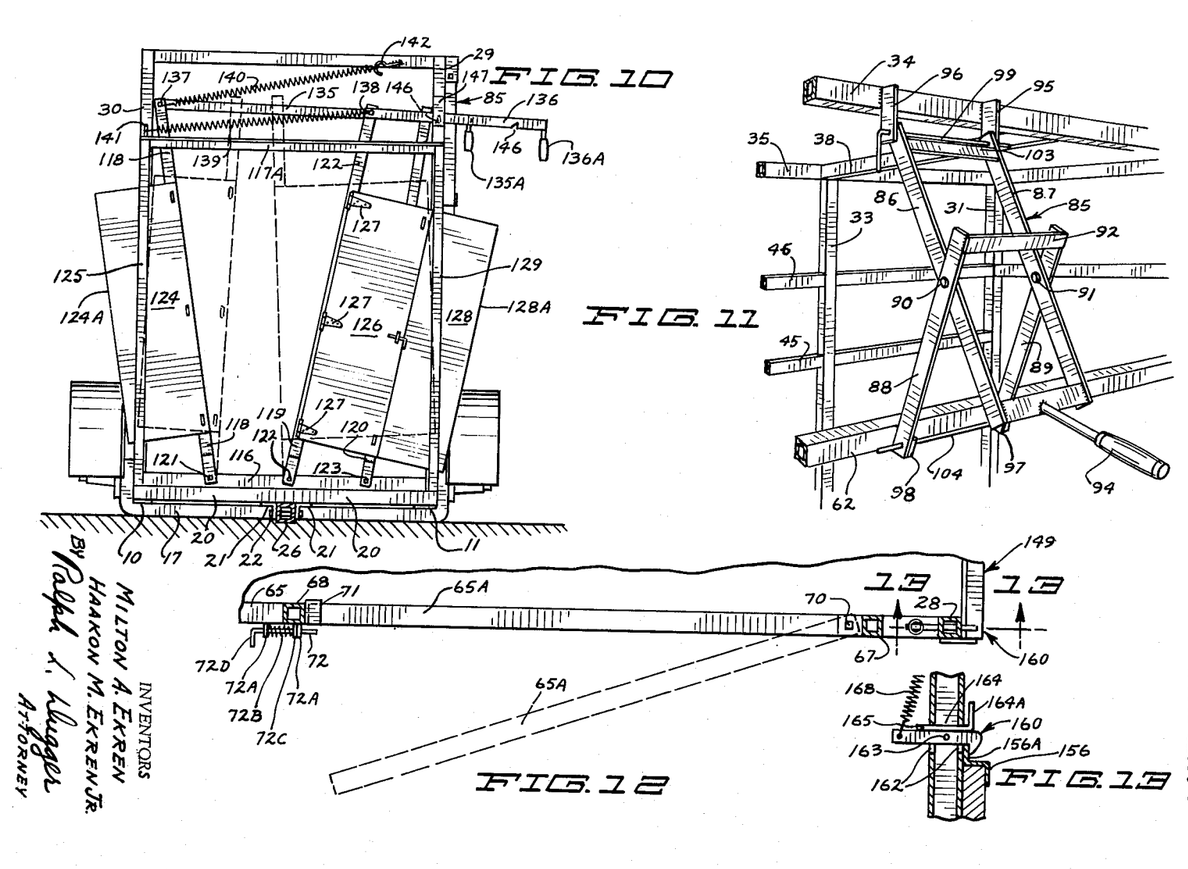
FIGURE 10 is a front elevational view corresponding to FIGURE 8, but with the neck restraining bars moved to "open" condition, as during the loading or unloading of an animal, during practical handling in a husbandry operation.
FIGURE 11 is a fragmentary perspective view of the over-center locking toggle mechanism, by means of which the moveable side of the device is manipulated as during movement from the position of FIGURE 6 (corresponding to FIGURE 11) to the position of FIGURE 5.
FIGURE 12 is a fragmentary horizontal sectional view, taken along the line and in the direction of arrows 12—12 of FIGURE 1.
FIGURE 13 is a fragmentary vertical sectional view taken along the line and in the direction of arrows 13—13 of FIGURES 4 and 12.

The post 118 has a plate of steel 124 welded to it, and the free edge 124A of this plate rests against the front of post 30, where it is retained by a vertical bar 125 that has its upper and lower ends welded in spaced relation to post 30, so as (with post 30), to provide a slot through which the plate 124 can slide as illustrated in FIGURE 10.

Upon post 119 there is likewise welded the edge of another (wider) plate 128 which likewise slides in a similar slot between post 29 and a bar 129 which has its top and bottom welded in spaced relation to the front surface of post 29. In this way plate 128 is held at edge 128A, against forward or rearward movement, but it is free to slide sideways.

Post 120 is not attached to plate 128 and merely provides a backing support. The upper end of post 120 works in the space between bars 117A and 117B, and when the device is used as a trailer, a pin 130 is placed through an appropriate hole in the bars 117A and B and the upper end of post 120 to hold it vertical. By removing pin 130, the post 120 can be swung to the FIGURE 10 position, so as to be out of the way of the upper end of post 119, when it is moved.

Figure 7:
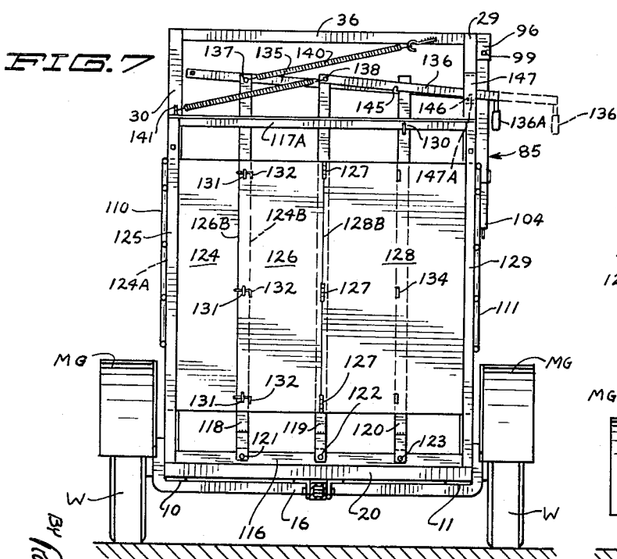
FIGURE 7 is a front elevational view taken along the line and in the direction of arrows 7—7 of FIGURE 1. Here the neck restraining bars and panels are in transport condition.

When the posts 118 and 119 and plates 124 and 128 are in the position of FIGURES 7 and 8, the front of the trailer is closed, except for the rectangular space between posts 118 and 119 and between cross tube 116 and bars 117A and 117B. To close this space a panel 126 is provided, and hingedly attached by hinges 127 to the edge 128B of panel 128, which is along the front centerline of post 119. Panel 126 is wide enough so that in the FIGURE 7 position its edge 126B overlaps the edge 124B of panel 124, and panel 126 has several slots in its edge positioned so that when in the FIGURE 7 position they will fall in place over an equal number of clips 131 which are welded to the front face of panel 124. Clips 131 are apertured to receive retaining pins 132, and when so fastened the front of the trailer is effectively closed by panels 124, 126 and 128. When the pins 132 are removed, panel 131 may be swung to the "open" position of FIGURE 8 and fastened flat against panel 128 where it is retained by a clip 134 which passes through the middle aperture. A pin 135 through a hole in clip 134 holds panel 126 in this "open" position, and in such condition (assuming pin 130 is removed and post 120 is freed), the posts 119 and 118

(and panels 124, 126 and 128) can be swung to the "open" position of FIGURE 10 for manipulating the posts 118 and 119 to restrain an animal at its neck, the upper ends of posts 118 and 119 reach above bars 117A and 117B, and are pivotally attached 137 and 138 to control bars 135 and 136 respectively. These control bars are retained at post 29 by two plates (plate 147 for bar 136 and plate 148 for bar 135) which are spaced from the front and rear surfaces of post 29 to form a slot for each bar, through which the bar can slide back and forth. In the bottom of each slot is a vertical detent tooth (147A behind bar 147; 148A behind bar 148), and the bottom edges of each of the bars 135 and 136 have notches at several places. Each of the bars 135 and 136 can be lifted a little so as to free its lower edge from the tooth with which it cooperates and when it is desired to lock the bar it is only necessary to pull it down until a notch in the bar embraces the tooth and the bar is then locked. Each bar has a handle (135A for bar 135; 136A for bar 136) at its outer end by means of which it can be manipulated and each post 118 and 119 has a spring 139 for post 119; 140 for post 118) to pull the post toward closed position. One notch in each bar also holds its post in the position of FIGURES 7 and 8. By suitable manipulation of handles 135A and 136A, the bars 118 and 119 and the attached panels can be moved from a limiting "closed" position, in which the upper ends of bars 118 and 119 touch, to a full open position as shown in full lines in FIGURE 10. The dotted line position shown in FIGURE 10 is an intermediate position, as for handling a medium size animal.

It will be noted that in the position of FIGURES 6 and 8 with animal's head between posts 118 and 119 (as in FIGURE 6), handle 135A (which controls post 118) is quite far out from the side of the trailer. This must be so, in order to allow post 118 to be pushed to the "open" condition (FIGURE 10), to release the animal. This is no disadvantage when using the device as a chute, but when using it as a trailer such outward position could be a disadvantage. To overcome this, pivot pin 137, by which bar 135 is attached to post 118, is made removable and bar 135 is provided with a hole 144 so positioned that the bar 135 can be released at pin 137, then the bar is pushed in towards the left side of the trailer and pin 137 reset through hole 144, with post 118 still vertical. It is noted that when in the FIGURE 7 (trailer) condition handle 136A is already near the side of the trailer.

On the rear ends of each lower side-rail 10 and 11 there are welded L-shaped brackets 150 and 152 which are provided with pivots 151 and 153 for supporting the end gate generally designated 149. This end gate is composed of angle iron side frames 154 and 155 and an angle iron end piece 156. The pieces 154 and 155 are so arranged that with the end gate down, as in FIGURE 2, one flange of each side angle will lie lowermost and directed toward the other angle (in the same way as for side rails 10 and 11 of the trailer), and thus form a ledge on which the ends of the tail gate crossplanking GP can rest. The angles hence have the upwardly directed flange outermost. The ends of the planks are held down by strips 154A and 155A of steel, laid flat on the planks and edge-welded to the outer flanges of angles 154 and 155 respectively and a few bolts or pins may be set through the angles and bars to prevent the plank from sliding sideways. The outer (or upper) edge of the end gate is composed of an angle bar 156 positioned as shown in FIGURE 1 with flange 156A outwardly. When in the lowered (dotted-line) position of FIGURE 1, the flange 156A is thus raised slightly above the ground, thus providing a fingerhold for raising the gate. Also, in the elevated position this same flange 156A is gripped by the latches generally designated 160, to hold the end gate closed. One latch 160, is set in each of the rear posts 28 and 31 and since both latches are identical, only one need be described. See FIGURES 1, 2, 12, and 13. Each rectangular cross-sectioned post is provided with vertical slots 162 in its front and rear faces, and a latch 160 is inserted therethrough and held by pivot 163, welded in place to the post. The forward end of the latch is biased upwardly by spring 168 having its upper end anchored on hook 166 on the post. The rear end of the latch is hooked shaped and is shaped to be raised by the flange 156A and then snap down to locking position, as in FIGURE 13. The slots 162 are made to permit the latch 160 to pivot such that its hooked shaped end can be raised above the top edge of flange 156A. Also, when latch 160 is in latched position, there is enough room in the space above it in slots 162, to permit safety-lock pin 164 having handle piece 164A, to be inserted. Pin 164 holds the latch 160 from moving upwardly to an unlatching position. When a cotter pin (not shown), is placed in hole 165 in pin 164 the pin cannot fall out and the whole end gate 149 is thus securely held.

Referring to FIGURES 1, 3, and 12, the position 65A of rail 65 is pivoted at 70, so as to swing out from the full to dotted line position of FIGURE 12, and even fully swing out, to give access to the animal. The front end of rail 65A swings into a U-shaped stirrup 71, welded to post 68, where it is held by pin 72 slidably mounted in aligned apertures in lugs 72A welded to post 68 and rail 65. The pin is nominally pressed to the right (in FIGURE 12) by a spring 72B which seats on a collar 72C welded to the pin 72. The bent end 72D forms a convenient handhold for the pin 72, for moving it.

For use as a chute, it is sometimes convenient to take the wheels off to lower the bed of the device. This can easily be done by manipulating the tongue and by use of a block ahead of the wheel. The trailer (loaded with a medium size animal) is balanced so as to be normally slightly heavy on the front. Balance can be easily changed by relocating the axle.

Referring to FIGURE 5, 170 denotes a kickbar which is of a length such that it reaches across between rail 43 and rail 64. Bar 170 has an axial pin 172 welded into its end and tubular rail 43 has a series of longitudinally spaced holes horizontally therethrough, spaced so that the pin 172 (and bar 170) can be placed closely adjacent the rear legs of the animal. Bar 170 is level, or nearly so and it will be noted that rail 68 of upper rail 60 is so located, that when lower panel 47 is swung down against the floor of the device and upper panel 60 is vertical, as in FIGURE 5, the upper surface of rail 64 will be just about level with the under surfaces of rail 43 (on the opposite side of the device), and the under surface of rail 170. A series of holes are also provided vertically in rail 64 at spacings corresponding to those in rail 43, and a cross pin 171, extending downwardly, is welded in the end of bar 170, so that by dropping pin 171 into its hole, the bar 170 is held in place. The holes in rails 43 and 64 are just big enough to permit placing the bar as described; pin 172 is inserted first, then pin 171 is dropped into place and the device is secure against animal kicking.

As many widely apparent different embodiments of this invention may be made without departing from the spirit and scope thereof, it is to be understood that we do not limit ourselves to the specific embodiments herein.

What we claim is:

1. A trailer-chute device comprising a wheel-supported rectangular floor having a towbar thereon and a frame including upright front and rear corner posts, movable front and rear end closures for said device attached so as to effectively close the front end space and rear end space between the front corner posts and rear corner posts respectively, horizontal rails along each side, the rails on at least one side constituting an upper and a lower panel and including supplementary posts, said lower panel being hinged to bottom level hinges on said floor adjacent the floor level and to intermediate level hinges between said lower and upper panels of rails on that side, the lower panel having a height which is substantially less than the width of the rectangular floor so that it can be folded down upon said floor and the balance of the floor left exposed as a chute floor, and means operative between said upper panel and said frame adjustably holding the upper panel when the lower panel is folded down on said rectangular floor.

2. The trailer-chute device of claim 1 further characterized in that said means for adjustably holding the upper panel is an over-center locking toggle device adapted to be pivotally attached to the upper panel and to framing attached to the corner posts along that side.

3. The trailer-chute device of claim 1 further characterized in that stiffener means is provided for holding said bottom level hinges and intermediate level hinges from hinging movement.

4. The trailer-chute device of claim 3 further characterized in that said stiffener means comprises separate spaced, axially aligned tubular members attached respectively to the rectangular floor, and upper and lower panels and a removable rod member for placement therethrough and extending across the positions of the bottom level and intermediate level hinges.

5. The trailer-chute device of claim 3 further characterized in that the front end of said upper panel is spaced in a longitudinal direction from the front corner post to leave space for insertion of neck restraining bars, and means is provided on the front corner post adjacent said upper panel for supporting said bars against substantial vertical movement.

6. An animal chute device comprising a rectangular floor having front and rear corner posts thereon, sides for the device attached to the posts, at least one of said sides being formed of articulated portions, one of said articulated portions being hingedly mounted adjacent said floor and operating means connecting the other of said articulated portions to said structure above said floor so that it can be set in and moved for laterally restraining an animal, a front end closure comprising spaced intermediate posts between the front corner posts, said intertermediate posts being hingedly mounted on the floor for sideways swinging movement, the upper ends of said intermediate posts being restrained from forward and rearward movement, flat panels attached to one edge to two adjacent intermediate posts and extending away from said posts, said panels being sufficiently extensive in width so as to cover the space from the intermediate post to which it is attached to the corner post outwardly therefrom, the edge of each said panel adjacent its corner post being a free edge, the space between said two intermediate posts not being covered by said panels, and means forming a slot on each corner post for holding the panel adjacent said post from movement longitudinally in respect to the rectangular floor of the device, each of said panels being freely slidable through its slot when the intermediate post to which it is attached is swung sideways.

7. The animal chute device of claim 6 further characterized in that two slide bar means are provided, one for each of said two intermediate posts, said slide-bar means extending transversely of the floor at an elevated level and attached to its intermediate post for swinging the upper end of said post sideways.

8. The animal chute device of claim 6 further characterized in that a swinging closure of sufficient width to cover the space between said two intermediate posts when they are vertical in respect to the floor is hingedly attached to one of the panels adjacent the post to which said panel is attached and fastening means is provided for holding said swinging closure to the other of said panels.

9. A trailer-chute device comprising a wheel-supported rectangular floor having a towbar thereon and side frames including upright front and rear corner posts, movable front and rear end closures for said device attached so as to effectively close the front end space and rear end space between the front corner posts and rear corner posts respectively, horizontal rails along one side attached to the front and rear corner posts respectively of said one side, a horizontal rail on the opposite side fixedly secured to the upper ends of the front and rear corner posts respectively of said opposite side, a second side comprising one restraining means including supplementary vertical posts, second restraining means, means pivoted on the lower end of said supplement posts and to said floor for selectively pivotally positioning the lower end of said one restraining means at a point inwardly toward said one side from the front and back corner posts on the said opposite side or positioning it in the plane of said opposite side, a lock bar pivotally connected at one end to the upper central portion of said one restraining means, a second lock bar pivotally connected at one end to said horizontal rail on said opposite side, means for pivotally connecting said lock bars at a position outwardly from the aforementioned bar pivot connections, and means on one of said lock bars positioned on its opposite end portion from the aforementioned pivot connections for selectively retaining said lock bars and the upper end of the one restraining means in a lock position when the lower end of said one restraining means is positioned inwardly from the front and back posts on said opposite side.

10. A trailer-chute device comprising a chute structure including a rectangular floor, a towbar secured to said floor, upright front and rear corner posts mounted on said floor, front and rear end closures movably attached to the respective front and rear corner posts for selectively closing the front end space and rear end space between the front corner posts and rear corner posts respectively, said front end closure having means for restraining movement of an animal on said floor, horizontal rails along one side of the floor intermediate a front and rear corner post, a top horizontal rail along the side of the floor intermediate the other front and rear corner post, a side panel for closing the space intermediate said other posts, pivoted means secured to the floor and to said panel for selectively retaining the lower edges of said panel in the plane of the said opposite side of the floor or at a substantial distance inwardly of said opposite side, lock means between said panel and said chute structure for releasably retaining the upper edge of said panel at a position a substantial distance inwardly from said opposite side of the floor to restrain movement of an animal on said floor, at least two wheels, and means for securing the wheels to the floor for easy removal and replacement to facilitate converting the device for use as a trailer or as a chute.

11. A trailer-chute device comprising a rectangular floor, a towbar secured to said floor, upright front and rear corner posts mounted on said floor, front and rear end closures movably attached to the respective front and rear corner posts for selectively closing the front end space between the front corner post and rear corner post respectively, said front end closure having means for restraining movement of an animal on said floor, horizontal rails along one side of the floor intermediate a front and rear corner post, a top horizontal rail along the opposite side of the floor intermediate the other front and rear corner posts, a side panel constituting a squeeze panel for closing the space intermediate said other posts, at least one connecting member hingedly secured to the floor and to the squeeze panel for selectively retaining the lower edges of said squeeze panel in the plane of said opposite side of the floor or at a substantial distance inwardly of said opposite side, lock means for releasably retaining the upper edge of said squeeze panel at a position a substantial distance inwardly from said opposite side of the floor to restrain movement of an animal on said floor, said lock means including a first arm having one end pivotally secured to the top rail and a second arm having one end pivotally secured to the top portion of said panel, and means pivotally connecting the first and second arms at intermediate portions thereof.

References Cited in the file of this patent

UNITED STATES PATENTS

| | | |
|---|---|---|
| 2,438,322 | McDonough | Mar. 23, 1948 |
| 2,593,559 | Hildenbrand | Apr. 22, 1952 |
| 2,703,554 | Haggard et al. | Mar. 8, 1955 |
| 2,764,129 | Haggard | Sept. 25, 1956 |
| 2,804,046 | Turner | Aug. 27, 1957 |